March 25, 1930.  D. C. DOZIER  1,751,910
VENTILATING MEANS FOR MOTOR VEHICLES
Filed March 12, 1928
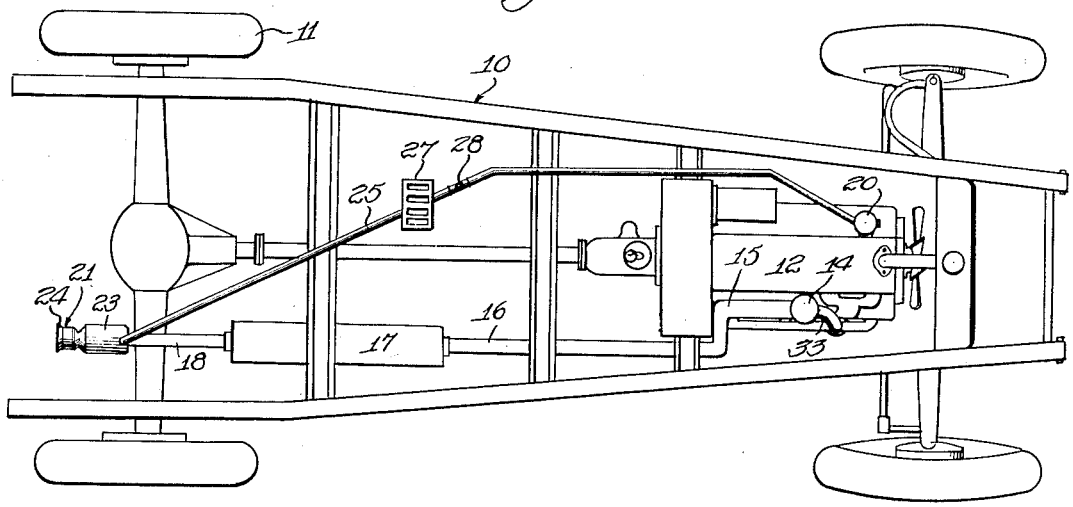
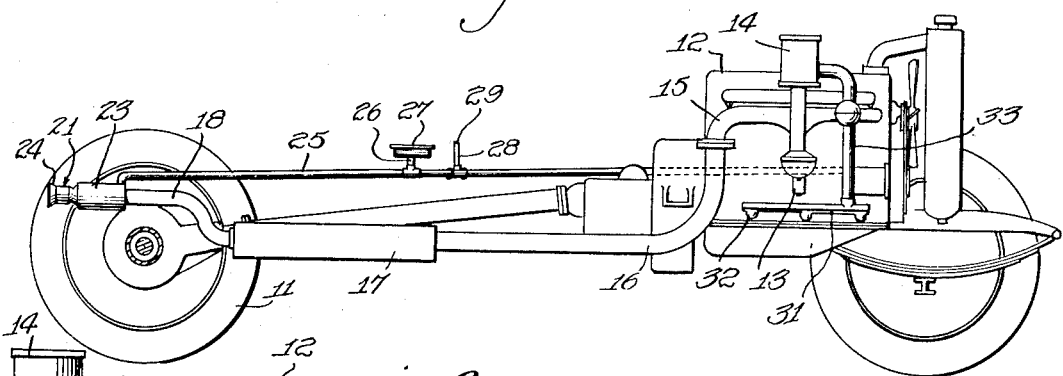
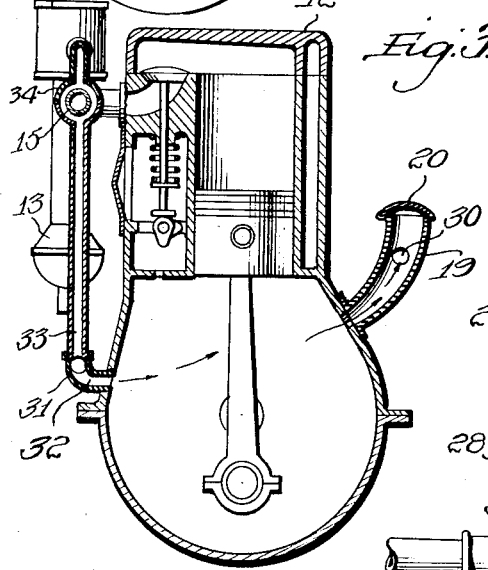
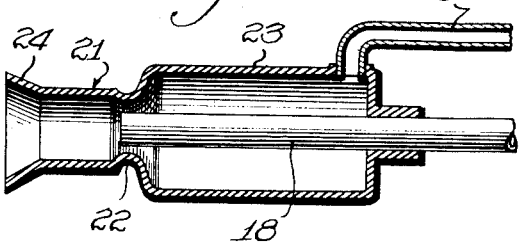
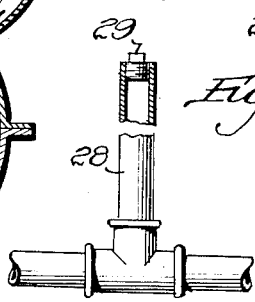
Inventor
D. C. DOZIER
Attorney Patented Mar. 25, 1930

1,751,910

UNITED STATES PATENT OFFICE

DANIEL C. DOZIER, OF NORFOLK, VIRGINIA, ASSIGNOR TO EDGERTON-DOZIER CORPORATION, OF SUFFOLK, VIRGINIA, A CORPORATION OF VIRGINIA

VENTILATING MEANS FOR MOTOR VEHICLES

Application filed March 12, 1928. Serial No. 261,007.

This invention relates to ventilating means for motor vehicles, and more particularly to means for ventilating the crank cases of motor vehicle engines.

An important object of the invention is to utilize the exhaust of a motor vehicle as means for creating a partial vacuum for effecting the ventilation of an automobile engine crank case.

A further object is to provide novel means for creating a partial vacuum in the crank case of an engine to withdraw gases therefrom, and to supply fresh air to the crank case to replace the polluted air and gases withdrawn therefrom.

A further object is to provide novel crank case ventilating means of the character referred to wherein means is provided for heating the fresh air supply to the crank case to prevent the condensation of moisture therein.

A further object is to provide ventilating means of the character referred to which is associated with the carbureter air cleaning means whereby fresh air substantially free from dirt and other foreign material is supplied to the crank case during the ventilation thereof.

A further object is to utilize the vacuum creating means for ventilating the interior of closed car bodies.

A further object is to utilize the vacuum creating means for cleaning the interior or other parts of the vehicle.

A further object is to provide novel ejector or similar means associated with the exhaust of the vehicle for creating the desired partial vacuum.

Other objects and advantages of the invention will become apparent during the course of the following description.

In the drawings I have shown one embodiment of the invention. In this showing,

Figure 1 is a plan view of an automobile chassis showing the invention applied,

Figure 2 is a side elevation of the same, parts being omitted,

Figure 3 is a vertical sectional view through the vehicle engine showing the crank case ventilating means associated therewith.

Figure 4 is a detail sectional view of the ejector and associated elements, parts being shown in elevation, and, Figure 5 is a detail view of the vacuum cleaner connection.

Referring to the drawings, the numeral 10 indicates the chassis of a motor vehicle mounted upon the usual wheels 11 and provided with a power plant comprising an internal combustion engine 12. The engine is provided with the usual carbureter 13 to which air is supplied from an air cleaner 14. An exhaust manifold 15 is arranged to one side of the motor in the usual manner and is connected to an exhaust pipe 16 which leads to a muffler 17. The vacuum creating means to be described may be associated with the pipe 16, but it is preferred that it be arranged rearwardly of the muffler, and for this purpose, the latter is provided with an outlet pipe 18 extending rearwardly thereof. The crank case of the engine is adapted to be filled with oil through a breather pipe 19 normally covered by a cap 20. The cap 20 preferably forms a complete closure for the upper end of the breather pipe, for a purpose to be described.

The device forming the subject matter of the present invention comprises an ejector casing 21 having a relatively narrow neck 22 surrounding the open rear end of the pipe 18. The forward portion of the casing 21 is enlarged as at 23 to form a chamber of substantial size, while the rear end of the casing increases in diameter as at 24 to permit the free egress of the exhaust gases from the pipe 18.

A conduit 25 communicates at its rear end with the casing 23, as clearly shown in Figure 4. Intermediate its ends, the conduit 25 is provided with a vertical branch 26 upon the upper end of which is mounted a ventilator 27. This ventilator communicates with the interior of a closed vehicle body mounted upon the vehicle chassis, the upper face of the ventilator preferably being flush with the floor of the body. The conduit also is provided with a second vertical extension 28 which may be normally closed at its upper end by a plug 29, for a purpose to be described.

The forward end of the conduit 25 is tapped into the breather pipe 19 through an opening 30 therein, and the creation of a partial vacuum in the conduit 25 is adapted to withdraw the polluted air and fuel vapors from the crank case of the engine, in a manner to be described. At the side of the engine opposite the breather pipe, a manifold 31 is arranged and is provided with a plurality of branches 32 communicating with the crank case. A vertical pipe 33 communicates at its lower end with the manifold 31 and at its upper end is tapped into the air cleaner 14, as indicated in Figures 2 and 3. Intermediate its ends, the pipe 33 is provided with an enlarged shell like portion 34 which surrounds a portion of the exhaust manifold 15 to be heated thereby.

The operation of the device is as follows:

The passage of exhaust gases from the pipe 18 through the rear end of the ejector 21 creates, by its velocity of movement, a partial vacuum in the casing 23, which vacuum is communicated to the conduit 25. The action of the partial vacuum operates to constantly withdraw air from the interior of the vehicle through the ventilator 27, thus maintaining the air within the vehicle body fresh and clean. Ordinarily such air is polluted with oil and fuel vapors by virtue of the seepage of such vapors from the vehicle engine into the interior of the vehicle body.

The branch 28 is provided in order that the partial vacuum within the conduit 25 may be utilized for vacuum cleaning the interior of the vehicle. For this purpose the plug 29 may be removed and the hose of a suitable vacuum cleaning nozzle may be attached to the upper end of the branch 28. For the purpose of attaching the vacuum cleaner, the upper end of the branch 28 may be either externally or internally threaded, or may be provided with any other suitable connecting means.

The rate of flow of air through the ventilator 27 is such as not to satisfy the partial vacuum within the conduit 25, and this partial vacuum thus is communicated to the crank case through the forward end of the conduit 25, the opening 30 and the breather pipe 19. Thus air and gases within the crank case constantly will be withdrawn therefrom, fresh air being supplied to the crank case through the manifold 31. In this connection, it is noted that the pipe 33 is preferably connected at its upper end to the air cleaner 14 whereby only clean fresh air will be supplied to the crank case.

The manifold 31 preferably is provided with a plurality of the branch pipes 32 to effect a more even distribution of air throughout the crank case. The air passing through the pipe 33 obviously passes around the exhaust manifold, through the shell like portion 34, and accordingly will be heated thereby. The heating of the air in the manner referred to has been found to prevent the condensation of moisture within the crank case, the air supplied thereto being constantly heated to a uniform warm temperature.

From the foregoing it will be apparent that effective means is provided for constantly ventilating the crank case without materially lowering the temperature thereof whereby the condensation of moisture therein is prevented. The ventilation of the crank case also serves the functions of minimizing oil dilution and preventing or minimizing the seepage of noxious fumes into the vehicle body. The interior of the body also will be ventilated from the same source of vacuum by the provision of the ventilator 27 while the branch pipe 28 serves as convenient means for utilizing the partial vacuum within the conduit 25 for cleaning the vehicle.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:—

1. A device of the character described comprising a conduit communicating with one side of the crank case of an internal combustion engine to deliver air thereto, a pipe communicating at one end with the opposite side of the crank case, means connected to the opposite end of said pipe for creating a partial vacuum therein, and a ventilator connected to said pipe intermediate its ends and adapted to deliver air thereto in insufficient quantities to satisfy the depression therein created by said means.

2. The combination with an internal combustion engine including a crank case and an exhaust, of a conduit for introducing air into one side of said crank case, a pipe communicating at one end with said crank case, an ejector enclosing said exhaust and connected to the opposite end of said pipe for creating a partial vacuum therein, and means connected to said pipe intermediate its ends and adapted to deliver air thereto in insufficient quantities to satisfy the depression therein created by said vacuum.

3. The combination with an internal combustion engine including a crank case and an exhaust, of a conduit for introducing air into one side of said crank case, means associated with said exhaust for creating a partial vacuum and communicating with said crank case, and means connected with said first named means to deliver air to said first named means in insufficient quantities to satisfy the depression created by said vacuum.

4. The combination with an internal combustion engine including a crank case, of a conduit for introducing air into one side of said crank case, means communicating with said crank case for creating a partial vacuum therein, and means connected to said first named means to deliver air to said first named means in insufficient quantities to satisfy the depression created by said vacuum.

5. In an engine driven vehicle including an internal combustion engine provided with a crank case, and an exhaust, the combination of an intake conduit communicating with the interior of said crank case, and an ejector conduit communicating with said exhaust and with the interior of said crank case, and connecting means intermediate the ends of said last named conduit adapted to receive accessory vacuum cleaning devices.

In testimony whereof I affix my signature.

DANIEL C. DOZIER.